United States Patent [19]

Oyama et al.

[11] Patent Number: 4,636,923

[45] Date of Patent: Jan. 13, 1987

[54] HEADLAMP FOR VEHICLE

[75] Inventors: Hiroo Oyama, Sagamihara; Tadashi Kouchi, Fuchu, both of Japan

[73] Assignee: Stanley Electric Co., Ltd., Tokyo, Japan

[21] Appl. No.: 759,652

[22] Filed: Jul. 26, 1985

[30] Foreign Application Priority Data

| | | | |
|---|---|---|---|
| Aug. 3, 1984 | [JP] | Japan | 59-163733 |
| Nov. 13, 1984 | [JP] | Japan | 59-172185[U] |
| May 16, 1985 | [JP] | Japan | 60-104823 |

[51] Int. Cl.[4] .......... B60Q 1/04

[52] U.S. Cl. .......... 362/80; 362/211; 362/298

[58] Field of Search .......... 362/61, 80, 211, 213, 362/215, 237, 238, 239, 240, 241, 281, 283, 297, 298, 299, 303, 301, 307, 311

[56] References Cited

U.S. PATENT DOCUMENTS

| | | | |
|---|---|---|---|
| 1,416,375 | 5/1922 | Mueller | 362/61 |
| 1,683,896 | 9/1928 | Jacob | 362/61 |
| 1,735,090 | 11/1929 | Pollard | 362/298 |
| 2,993,987 | 7/1961 | Diffie | 362/298 |
| 3,767,288 | 10/1973 | Gross | 362/80 |

FOREIGN PATENT DOCUMENTS

| | | | |
|---|---|---|---|
| 691341 | 10/1930 | France | 362/298 |
| 2115543 | 9/1983 | United Kingdom | 362/215 |

*Primary Examiner*—Willis R. Wolfe, Jr.
*Assistant Examiner*—David A. Okonsky
*Attorney, Agent, or Firm*—Frishauf, Holtz, Goodman & Woodward

[57] ABSTRACT

The present invention is to provide the headlamp for the vehicle characterized with the revolution paraboloidal reflector, the lamp in which the filament is located at a near focus of the reflector, the first reflecting plates to reflect the beam of more than about half of the beam from the above reflector to the oblique- upper and lower directions in the right and left sides or to the either direction respectively, the second reflecting plates arranged in parallel to the first reflecting plates to reflect the beam from the corresponding reflection faces in parallel to the same direction of the remained parallel beam, the slender rectangular shape front lens provided in front of the above reflector recieving the direct-parallel beam from the above reflector and the parallel beam from the second reflecting plates.

20 Claims, 26 Drawing Figures

HEADLAMP FOR VEHICLE

BACKGROUND OF THE INVENTION

Field of the Invention

The present invention relates to a headlamp or a foglamp for a vehicle in which the illumination surface of the beam is a laterally extending rectangular shape.

Description of the Prior Art

Rectangular type headlamps, simply speaking, are designed to have a rectangular shape when it is viewed from the front side, by cutting off the top, bottom, right and left sides of a circular shape headlamp. This kind of rectangular shape headlamp comprises three parts, a portion from which a light is radiated (lamp), a paraboloidal reflector and a front lens. As shown in FIG. 18, if the rectangular portion 2 being inscribed with a circle is utilized, the remained portions of E, F, G, and H are not utilized for radiation area, resulting in a dark lamp.

In order to prevent this decrease of quantity of light, the rectangular shape headlamp is generally designed, as shown in FIG. 19, to use a larger circular reflector 4 than the conventional circular shape reflector 3, by utilizing the rectangular portion 5 being inscribed within this circle. According to this design, the loss of the light from the top and bottom sides of the reflector can be compensated with a beam from the oblique line portions of left and right sides (the light which is conventionally not necessary to use in the circular shape). Also, a halogen lamp having the same consumed electric power and being brighter than the others, (the light quantity is increased to 30 to 40%) is used to prevent the decrease of light quantity of the headlamp.

The rectangular shape headlamp, as shown in FIG. 20(*a*), having an aspect ratio of about 1:1.4 to 1:2, and recently in order to reduce the air resistance of the vehicle and to raise the fuel consumption rate, and also from the design requirement to form the headlamp shape to be more slender to the horizontal direction, is required. But for the headlamp formed by cutting the top, bottom, left and right sides of the circular shape headlamp, as shown in FIGS. 20(*b*) and (*c*), the more the shape becomes slender, the more the ratio of the volume escaping to the upper and lower directions to the total volume from the lamp increases. For a lamp having the same consumed electric power, the decrease of the light quantity increasingly becomes large. Designing the lamp more slender is considered to be a difficult problem because of the efficiency improvement of the halogen lamp being almost to its limit.

For some of the highly graded cars, a design is adopted in which the lamp is enclosed inside of the bonnet when not in use during daytime and it is raised out from the bonnet when in use at night. But, an increase of air resistance during night driving is inevitable for this kind of design.

Moreover, a design in which plural small rectangular shape headlamps are arranged in a line forming a set of headlamps has a problem in maintenance, etc.

OBJECTS OF THE INVENTION

The main object of the present invention is to provide a headlamp for a vehicle in which the illumination surface is a slender rectangular shape and has a high beam utilization rate. Another object of the present invention is to provide a rectangular headlamp in which the minute adjustment of the illumination light can be done from the outside.

Another object of the present invention is to provide a headlamp in which the emitting portion of the illumination beam can be formed to be a rectangular shape using the conventional headlamp without a decrease of the utilization rate of light.

Another object of the present invention is to provide the headlamp in which a glare is not emitted from the inside of the headlamp, when it is viewed from the outside.

SUMMARY OF THE INVENTION

According to the present invention, a vehicle lamp comprises: a housing having a front portion and a rear portion; a paraboloidal reflector at said rear portion of said housing; a laterally extending slender rectangular shaped front lens located at said front portion of said housing and facing in substantially the same direction as said paraboloidal reflector; a lamp located so that the position of a filament thereof is at or near the focus of said paraboloidal reflector, whereby light produced by said lamp is reflected by said paraboloidal reflector in substantially the axial direction of said paraboloidal reflector; at least two first reflecting plate members mounted in said housing so as to reflect right and left side portions of a portion of the light reflected by said paraboloidal reflector in an oblique upper or lower direction; at least two second reflecting plate members positioned in parallel to respective first reflecting plate members, said at least two second reflecting plate members reflecting the light reflected from a corresponding first reflecting plate member in a direction substantially parallel to the light reflected by said paraboloidal reflector and in the same direction as said light reflected by said paraboloidal reflector; said first reflecting plate members being arranged to reflect light reflected from one of an upper or a lower portion of said paraboloidal reflector in said oblique upper or lower direction, the light from said upper or lower portion of said paraboloidal reflector being reflected by said paraboloidal reflector directly to said front lens; said laterally extending slender rectangular shaped front lens being located in front of said paraboloidal reflector and in front of said first and second reflecting plate members for directly receiving a portion of said light reflected from said paraboloidal reflector, and for receiving the reflected right and left side portions of light from said second reflecting plate members, thereby providing a substantially uniform rectangular light beam having a high light utilization rate.

By using the first and second housings, an all glass shielded beam or a metal back shielded beam as an inside light source can be used, so the conventional headlamp can be easily changed to the slender rectangular type and the glare can be removed by painting a dark color on the inside of the housing when viewed from the outside.

DETAILED DESCRIPTION OF THE INVENTION

Figure 1:
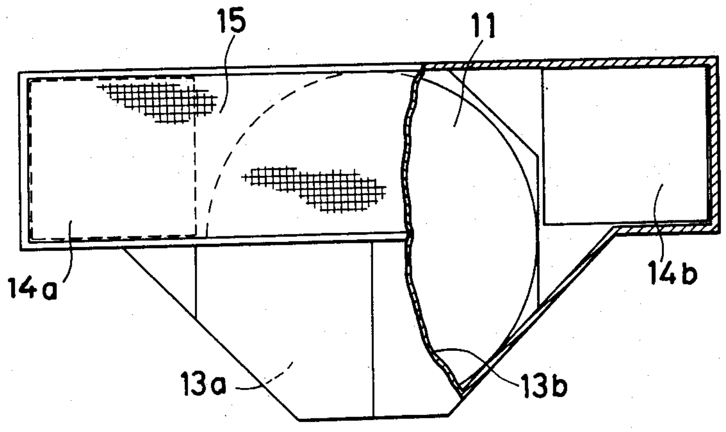
FIG. 1 is the front view of the headlamp according to the first embodiment of the present invention and shows a portion of this device being removed.
Figure 2:
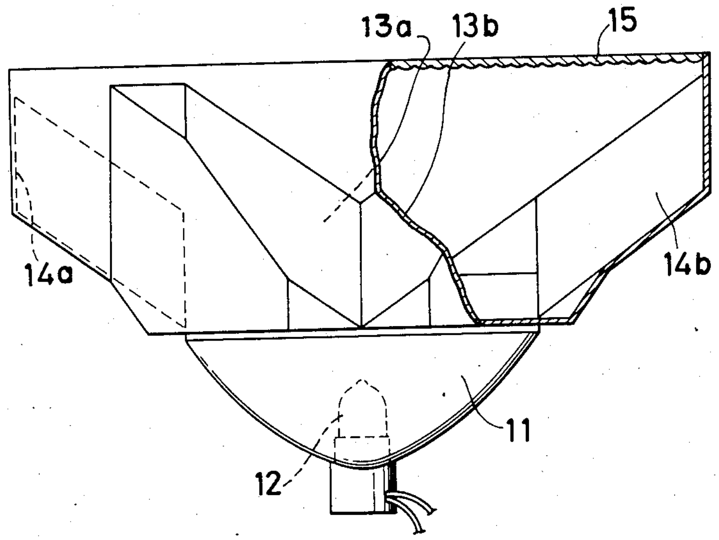
FIG. 2 is a view from the bottom in which a portion of the headlamp of the first embodiment is removed.
Figure 3:
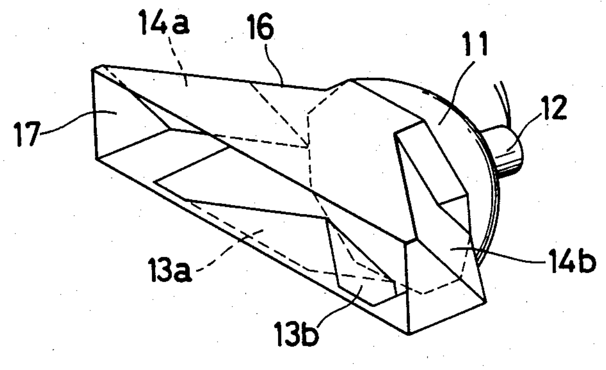
FIG. 3 shows the headlamp of the first embodiment viewed from an oblique point.

A description of the present invention is given in detail using some embodiments.

In the explanation of the headlamp of the first embodiment of the present invention shown in FIG. 1 to FIG. 6, 11 is the revolution paraboloidal reflector used in the common circular headlamp. The lamp 12 is positioned so that the filament may be located at a focus of the revolution paraboloidal reflector 11. The first reflecting plates **13*a* and 13*b* are provided in front of the reflector 11 at a same level with the lower half portion of the reflector in order to reflect the approximately parallel beam reflected from the reflector 11 to the oblique-upper directions at right and left sides of the lamp, and the second reflecting plates of 14*a* and 14*b* are provided in parallel to each respective first reflecting plate at the upper position of both sides of the reflector 11, and reflect the beam in parallel and in the same direction of the parallel reflected beam from the upper half portion of the reflector 11 respectively, and lead the beam to enter into the front lens 15 located in front of the reflector 11 at a same level with the upper half portion of the reflector. The front lens 15 is formed to be rectangular in shape with an approximately same vertical dimension as the radius at the end of the opening of the above reflector 11 and with a considerably larger width than the diameter of the reflector 11, having an aspect ratio of about 1:4. The above first reflectors 13*a* and 13*b*, and the second reflectors 14*a* and 14*b* are provided inside one housing 16, and the rectangular opening 17 for attaching the above front lens 15** is provided at the front of this housing.

Housing 16 can be separately produced from the reflector 11 and then can be put together, or can be formed at one time including the reflector 11.

In this case, the housing 16 itself is to be formed of resin, the reflectors **13*a*, 13*b*, 14*a* and 14*b* are formed by treating the corresponding portions of the housing 16** to be mirror surfaces or other mirrors can be attached to the housing for example by bonding, etc.

Figure 4:
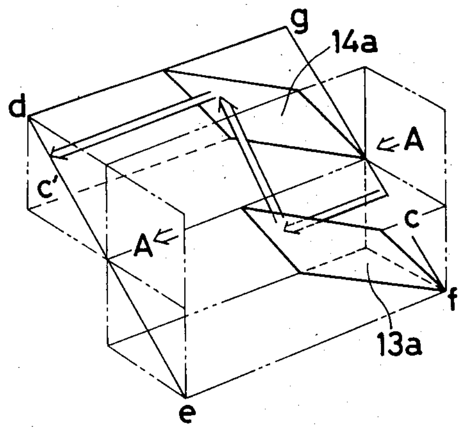
FIG. 4 is an explanatory diagram which shows the state of the beam course of a pair of the reflectors of the headlamp of the first embodiment.
Figure 5:
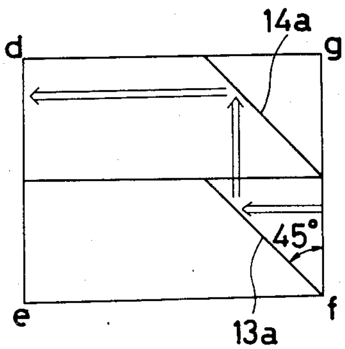
FIG. 5 is an explanatory diagram viewed from the side which shows the state of a beam for a pair of reflectors.

In the illumination device of the above construction, as for the beam from the lamp 12 after reflecting from the revolution paraboloidal reflector 11, the beam from the upper half portion of the reflector directly reaches to the lens 15, the beam from the lower half portion of the reflector 11 reflects on the first reflecting plates **13*a* and 13*b* respectively toward the oblique-upper direction at the right and left sides respectively and reaches to the second reflecting plates 14*a* and 14*b*. The second reflecting plates 14*a* and 14*b* are in parallel to the first reflecting plates 13*a* and 13*b* respectively. The beams from the first reflecting plates 13*a* and 13*b* reflect on the second reflecting plates 14*a* and 14*b* respectively and proceed almost in parallel to the same direction of the beam from the upper half portion of the reflector 11 and go outside through the lens 15. FIGS. 4 and 5 show the state of the reflection at the left hand portion when the headlamp is viewed from the front. The reflection states at the A and C areas are explained for the case of the headlamp being divided into four segments. In the plane defined with the points d, e, f and g wherein the reflecting plates 13*a* and 14*a* are arranged to be at a right angle to this plane, the beam reflected on the C face of the reflector 11 reflects on the reflecting plate 13*a* to the oblique-upper direction and this beam is further reflected by the reflecting plate 14*a* and proceeds forward. In this case, the position of the reflected beam is arranged to the left side of the beam which reflects on the A area of the reflector 11 and directly proceeds forward. The reflections at the right half of the reflector 11 are similar. To arrange the beams in this way, the reflecting plates 13*a* and 14*a* are inclined with an angle of 45° and the reflecting plates 13*a* and 14*a*** are in parallel with each other.

Figure 6:
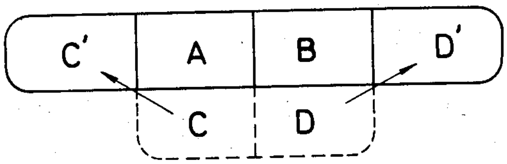
FIG. 6 is the pattern diagram of the beam distribution for the first embodiment.
Figure 7:
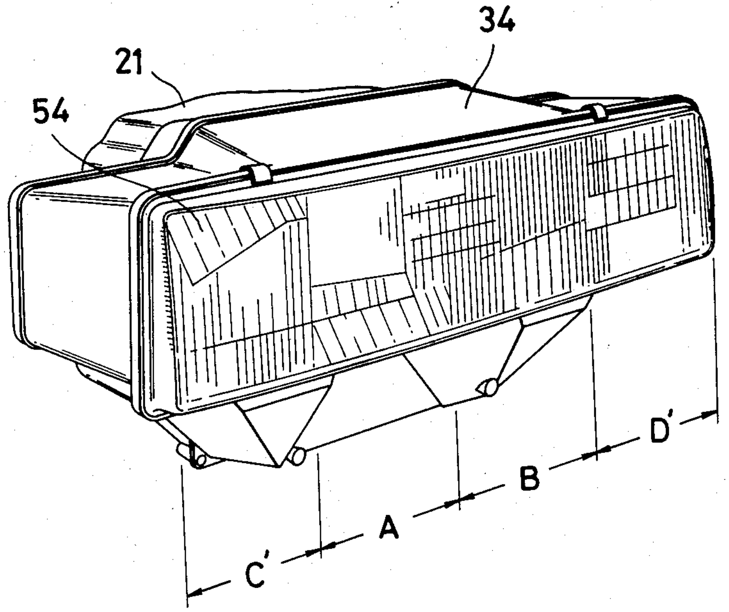
FIG. 7 is a view from an oblique point, showing the headlamp according to a second embodiment of the present invention.
Figure 9:
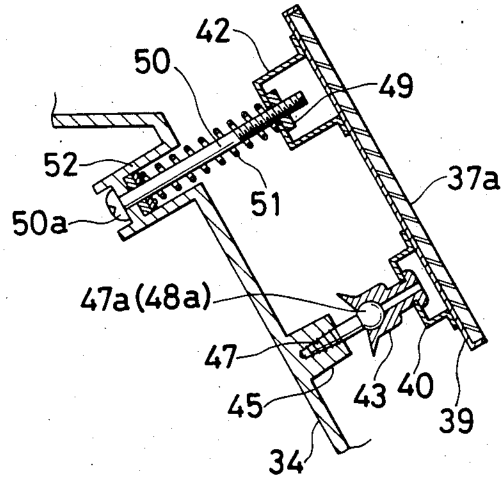
FIG. 9 is an enlarged cross sectional drawing of the support portion of the reflector for the second embodiment.
Figure 8:
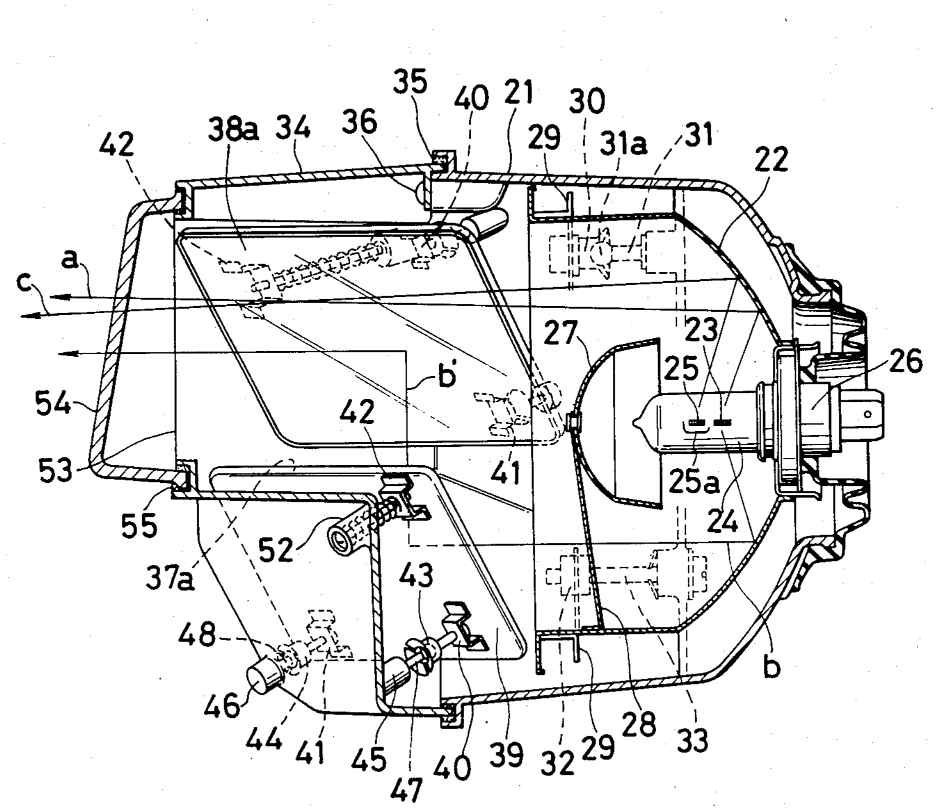
FIG. 8 is a vertical cross sectional taken at the center portion of the headlamp of the second embodiment.
Figure 10:
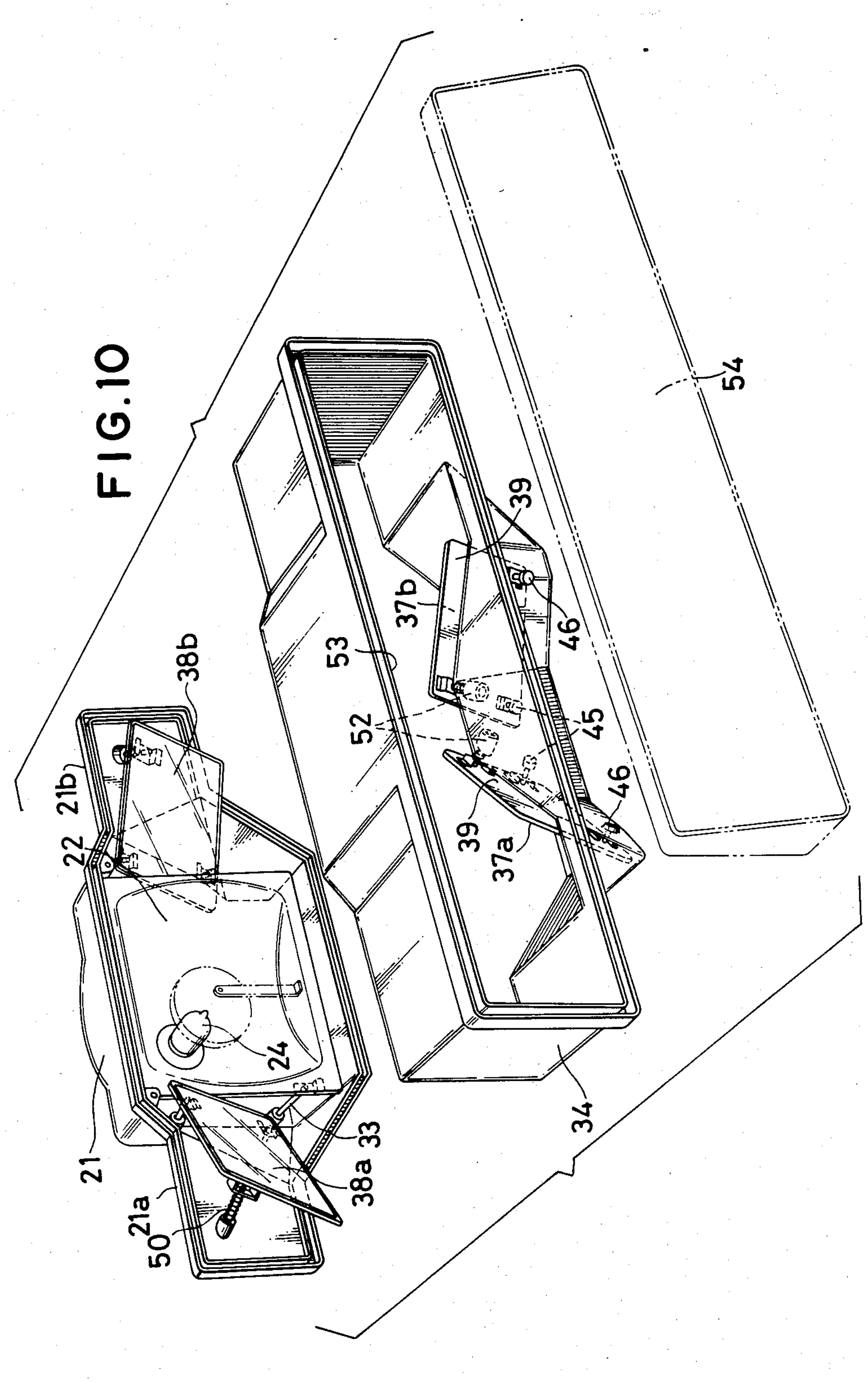
FIG. 10 is a view from an oblique point in which the important portion of the headlamp of the second embodiment is disassembled.

In this way, the beams reflected on the A and B areas of the upper half portion of the reflector 11 directly proceed into the front lens 15 and go outside, and the beam reflected on the C and D areas of the lower half portion reflect to the oblique-upper directions at the right and left sides respectively, and further reflect on the reflecting plates **14*a* and 14*b* and go outside through the front lens 15 respectively. Therefore when the beams reflected on the C and D areas of the lower half portion of the reflector 11 proceed outside through the front lens, as shown in FIG. 6**, the beam can be arranged as the C′ and D′ areas to the both sides of the A and B areas, thus forming the illumination surface to be a laterally long rectangular shape.

In the second embodiment shown in the FIGS. 8 to 16, the headlamp shown is for a vehicle and comprises a first housing 21. The paraboloidal reflector 22 is provided inside the housing 21, and the lamp 24 is provided so that the main beam filament 23 may be positioned at or near focus of the paraboloidal reflector. Lamp 24 has a sub beam filament 25 in addition to the above main beam filament, and is attached to the paraboloidal reflector 22 through the socket portion 26. Further, the cup shape shield 27 is attached to the paraboloidal reflector 22 in front of the lamp 24 through the stay 28, preventing the beam from the lamp 24 from direct radiating. 25*a* is the hood of the sub beam filament 25.

In attaching the paraboloidal reflector 22 to the first housing 21, the flange 29 is attached to the outer periphery of the reflector 22 and this flange 29 is supported to the housing 21 at three points, namely, the nylon socket or receptacle 30 for the pivot 31 is attached at one point, and the head portion 31*a* of the pivot 31 is inserted in the nylon socket 30 with free rotation. The other end of this pivot 31 is fixed to the housing 21 by press fit and bolting. At the remaining two points, a nut 32 made of nylon and etc. is fixed to flange 29. The nut 32 is screwed to the one end of the beam axis adjustment screw 33. The other end of screw 33 extends outside the flange 29. The beam axis adjustment screw 33 can be adjusted at any position by rotating same by a suitable jig.

The second housing 34 is fixed to the front opening of the housing 21 through the shield material 35 by fastening members 36 such as screws at plural points. Inside this second housing 34, a pair of the first reflecting plates 37*a* and 37*b* reflect the near parallel beams reflected on the lower portion of the above reflector 22, to the oblique-upper directions at the right and left sides respectively, and a pair of the second reflecting plates 38*a* and 38*b* are arranged substantially in parallel with the first reflecting plate at the oblique-upper position from the first reflecting plates and reflect the beams from the first reflecting plates 37*a* and 37*b* substantially parallel to the other beams.

The manner of the fixing a pair of these reflecting plates are same for both sides, so the explanation of the mechanism is given for only one side and the explanation for the other side is abbreviated. Namely, the first reflecting plate 37*a* is supported at the whole area of the back through the plate shape retainer 39 provided on the back and connected to the second housing 34 with the three supports. In this case, one of the three supports is for adjustment and the remaining two supports are for fixing. Explanations for each case are separately given as follows. The three trapezoidal attachments 40, 41 and 42 are fixed on the back of the retainer 39 at positions close to each corner forming the three points of a triangle. The attachments 40 and 41 are for fixing, and are attached at the lower edge portion of the retainer 39. The attachment 42 is for adjustment and is attached to the upper edge portion of the retainer 39. The holders 43 and 44, made of resin, are fixed to the attachments 40 and 41 for fixing respectively and the boss portions 45 and 46 are provided on the second housing 34 at a corresponding positions of these holders. The head portions 47*a* and 48*a* of the connecting pins 47 and 48, which are planted or screwed into the boss portions, are retained with free rotation by insertion into the above holders 43 and 44 respectively.

The nut 49 made of the nylon or metal is fixed on the above adjustment attachment 42. One end of the adjustment bolt 50 is screwed into the nut. The head 50*a* of the adjustment bolt 50 is extruded from the front of the second housing 34. A coiled spring 51 is provided around the adjustment bolt 50 between the attachment 42 and the second housing 34 and acts to separate both parts. A boss portion 52 is formed on the front side of the second housing 34, and the adjustment bolt 50 is inserted or screwed into the boss portion.

The second reflecting plates 38*a* and 38*b* are provided on both sides and are in near parallel with the first reflecting plates 37*a* and 37*b* respectively, and the retaining structure is almost same as for the first reflecting plates 37*a* and 37*b*, so the explanation is abbreviated, using the same reference numerals. The second reflecting plates 38*a* and 38*b* are attached to both sides 21*a* and 21*b* of the first housing 21, and the attachments 40 and 41 for fixing are provided on the back of the reflecting plates at a position close to the edge. The heads of the adjustment bolt 50 for the second reflecting plates 38*a* and 38*b* are extruded from the backs of the wing portions 21*a* and 21*b* and can be rotated from a backs of the wing portions 21*a* and 21*b* with the suitable jig.

Figure 11:
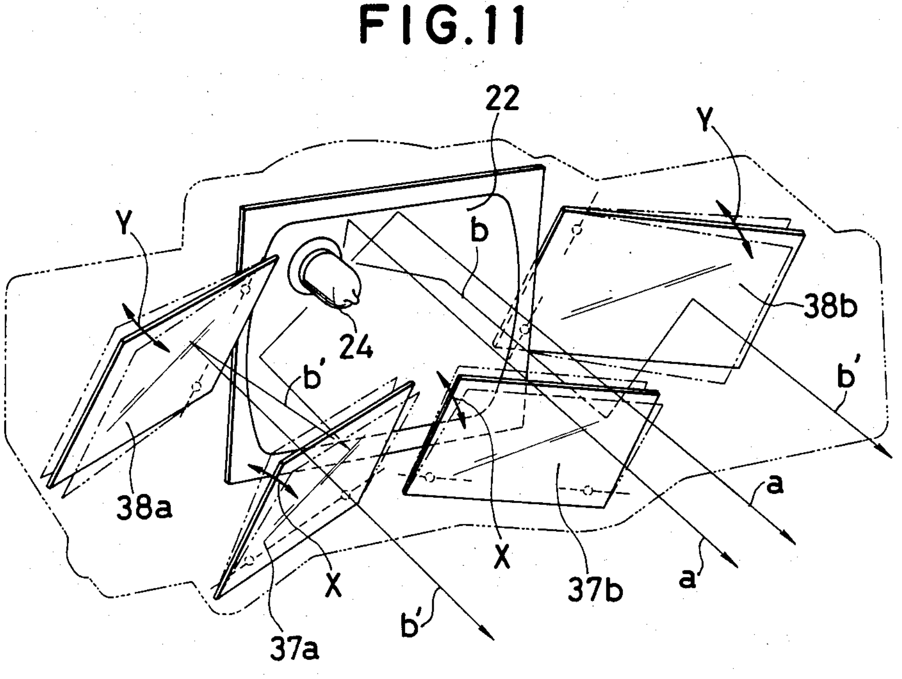
FIG. 11 is is a view from an oblique point for only the important portion of the headlamp of the second embodiment in which the relationship of the reflector position and the state of the reflection are shown.
Figure 12:
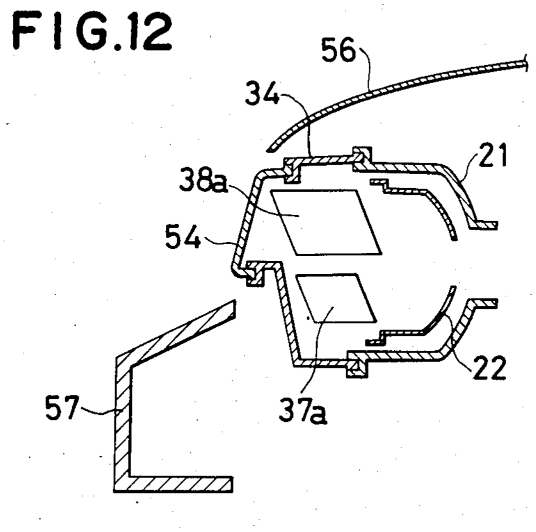
FIG. 12 is a rough cross sectional view of the state of the headlamp of the second embodiment being attached to the vehicle.

In the above way, the second reflecting plates 38*a* and 38*b* are attached to the first housing 21. The second housing 34, in which the first reflecting plates 37*a* and 37*b* are being attached, is connected to the first housing 21. The first reflecting plates 37*a* and 37*b*, and the second reflecting plates 38*a* and 38*b*, are in parallel condition respectively, as shown in FIG. 11. The first reflecting plates 37*a* and 37*b* can be rotated in the direction of the arrows X, and the second reflecting plates 38*a* and 38*b* can be rotated in the direction of the arrows Y, by rotating each adjustment bolt 50 from the outside. Therefore, by rotating either or both of the reflecting plates 37*a*, 37*b*, 38*a* and 38*b*, fine adjustment of the radiation beam can be accomplished. The slender rectangular shape opening 53 is formed on the upper portion of the front side of the second housing 34, and the slender rectangular shape lens 54 is attached to this opening. Seal material 55 being is put on the whole periphery of the opening and is used in attaching the lens 54. The opening 53 is formed on the upper portion, but this opening also can be formed on the lower portion.

Figure 13:
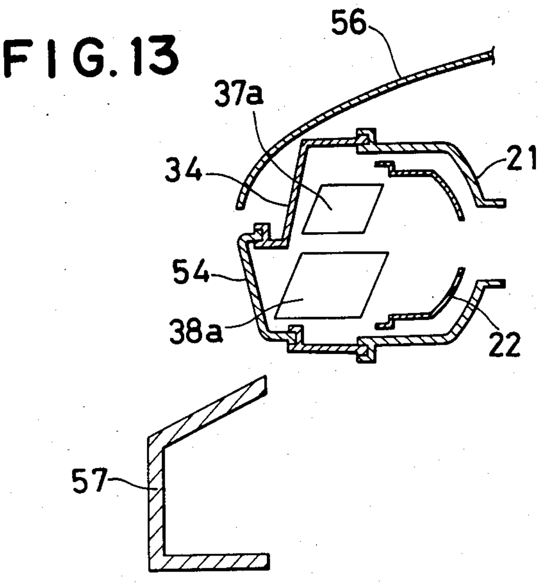
FIG. 13 is a rough cross sectional drawing which shows, in the same way as shown in FIG. 12, a modified example of the headlamp of the second embodiment.

When the headlamp is attached to the vehicle as shown in FIG. 13, the first reflecting plates 37*a* and 37*b* are attached to the upper portion, and the second reflecting plates 38*a* and 38*b* are attached to the lower portion respectively. As the positions of the first and second reflecting plates for the second embodiment are in reverse in the upper and lower directions compared with the above first embodiment, the explanation is abbreviated, using the same reference numerals for the same portions. 56 is the bonnet and 57 is the bumper. In the headlamp according to the second embodiment of the present invention, when the main beam filament 23 is lighted, the beam reflected on the near upper half portion of the paraboloidal reflector 22 is taken out as the near parallel beam through the lens 54, and the beam reflected on the near lower half portion of the paraboloidal reflector 22 reaches the first reflecting plates 37*a* and 37*b* as a near parallel beam. The reflected beam b' from the first reflecting plate, and the beam reflected from the second reflecting plates 38*a* and 38*b* enter into the front lens 54 and go outside in near parallel to the above reflected beam respectively. When the sub beam filament 25 is lighted, the beam C reflected on the near upper half portion of the paraboloidal reflector 22 directly enters into the front lens 54 and goes outside having a slightly downward direction. In this case, the volume of the beam reflected on the lower half portion of the paraboloidal reflector 22 is small because of the existence of the hood 25*a*. This small amount of the beam is taken outside after reflecting on the first and second reflecting plates.

Figure 14:
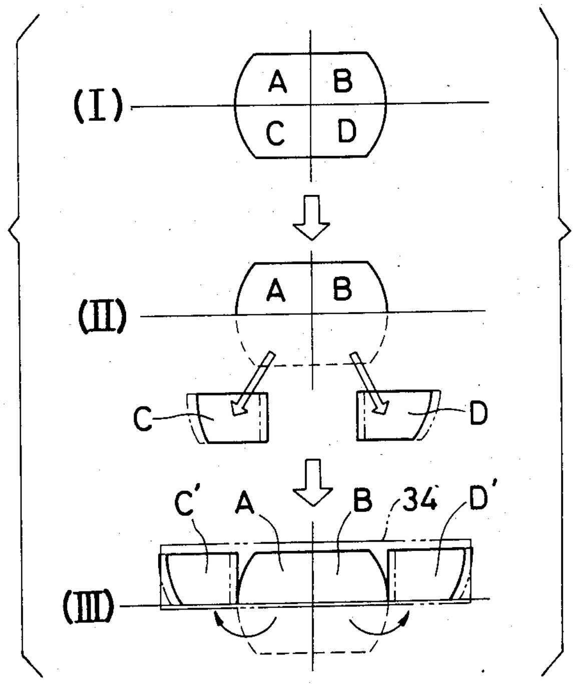
FIGS. 14-(I), (II) and (III) are explanatory diagrams of the beam distribution pattern of the headlamp of the second embodiment.
Figure 15:
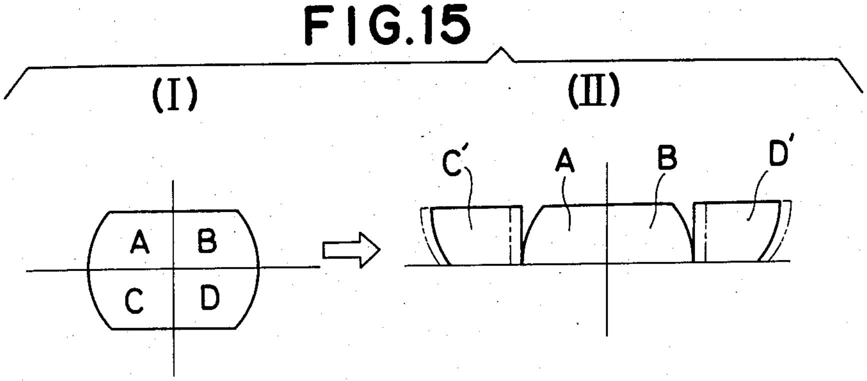
FIGS. 15-(I) and (II) are diagrams showing the beam distribution pattern for the second embodiment in the case of the main beam filament being lighted.
Figure 16:
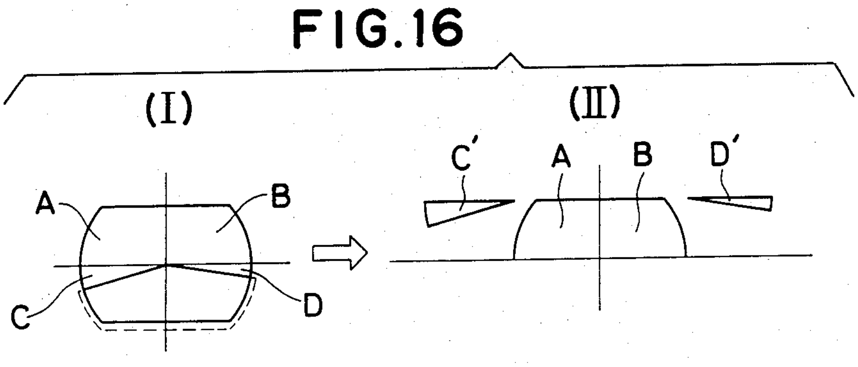
FIGS. 16-(I) and (II) show the beam distribution pattern for the second embodiment when the sub beam filament is lighted.

The above reflection states are explained in detail using FIGS. 14-(I), (II), (III), FIGS. 15-(I), (II), and FIGS. 16-(I), (II). In FIG. 14, in case of the two standard reflectors being used, the pattern of the reflected beam from the paraboloidal reflector, by assuming the paraboloidal reflector 22 to be divided into four segments of A, B, C and D, is shown in FIG. 14(I). A and B are the areas for the beam reflected on the upper half portion of the paraboloidal reflector 22, and C and D are the areas for the beams reflected on the lower half portion of the reflector. The beams in the areas of A and B reflected on the upper half portion of the reflector are taken outside as the parallel beam, the beams in the areas C and D reflected on the lower half portion of the reflector, as shown in FIG. 14(II), are separated almost evenly to both sides and reflect on a pair of the first reflecting plates 37*a* and 37*b* toward the oblique-upper direction respectively. Since the beams reflected to the oblique-upper direction then reflect on the second reflecting plates 38*a* and 38*b* and proceed forward in near parallel relationship, as shown in FIG. 14(III), the beam in the areas of C′ and D′ can be arranged to the both sides of the above areas of A and B. Therefore, when the main beam filament 23 is lighted, the reflected beams from the paraboloidal reflector 22, as shown in FIG. 14(II), are arranged on the horizontal line without loss, so there is no decrease of beam volume.

For the case of the sub beam filament 25 being lighted, as shown in FIG. 16-(I), the near upper half portion of the paraboloidal reflector 22 is utilized, and the small areas for the reflected beams from the lower half portion are arranged as shown in FIG. 16(II). The beams are arranged on the horizontal line, and if the positions of the beams are moved due to the deviation of the positions of the first reflecting plates 37*a* and 37*b*, and the second reflecting plates 38*a* and 38*b*, as shown in the pattern diagram with the assumed lines, the suitable positions can be obtained by moving the reflecting plates through rotating the adjustment bolt 50 attached to each reflecting plate, in the required directions. If there is a deviation in angle in the relative position relationship with the paraboloidal reflector 22, the correct position can be gotten by rotating the beam axis adjustment screws 33 in the required directions.

It is difficult to produce the first and second housings 21 and 34, and the first and second reflecting plates 37*a*, 37*b*, 38*a* and 38*b* without dimensional errors. A deviation of the relative positions is apparently caused when the parts, having dimensional errors, are assembled. This deviation is finely adjusted during assembling with the above described adjustment mechanisms.

In the alternative example shown in FIG. 13, the utilization method of beam is substantially the same as in the above case. As for the reflecting plates, concave and convex shaped reflecting plates can be also used.

Figure 17:
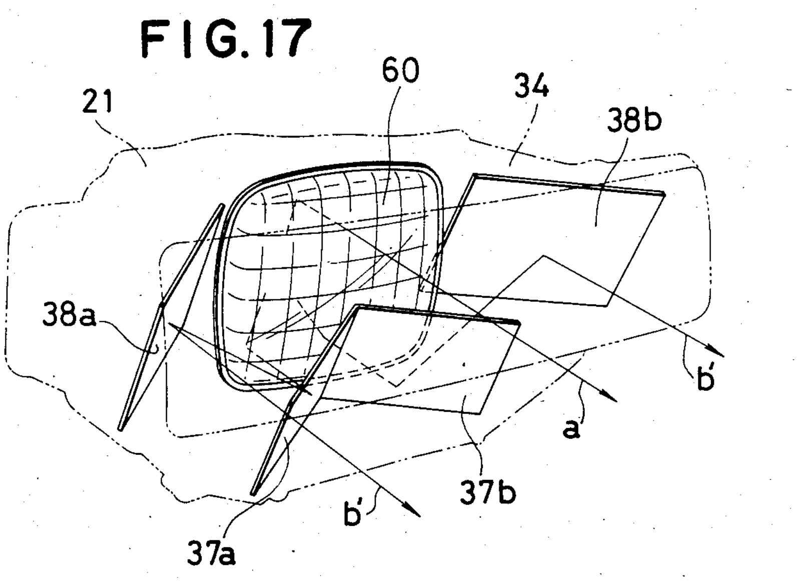
FIG. 17 is a rough view from an oblique point shows the headlamp for the third embodiment relates to the present invention.
Figure 18:
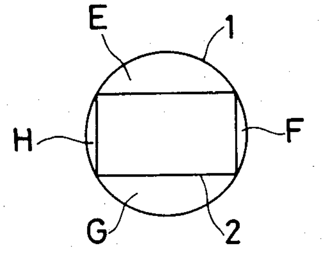
FIG. 18 and FIG. 19 are explanatory diagrams which show the difference in the beam volume between the conventional circular type headlamp and the rectangular type headlamp.
Figure 19:
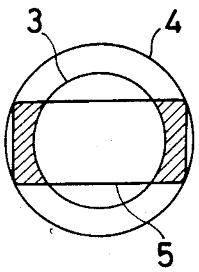
Figure 20A:
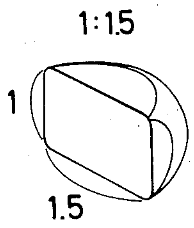
FIGS. 20-(*a*), (*b*) and (*c*) are rough diagrams viewed from oblique points which show the change of the rectangular shape headlamp with the required aspect ratio.
Figure 20B:
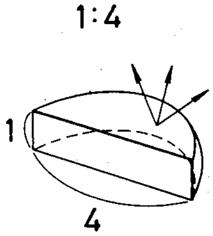
Figure 20C:
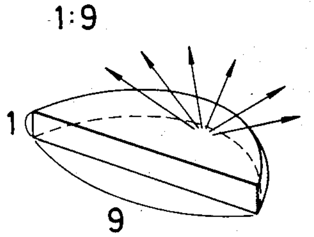

Below is an explanation of the third embodiment of the invention shown in FIG. 17. In this embodiment, an independent headlamp 60 is used instead of the paraboloidal reflector 22 and the lamp 24 used in the second embodiment. This independent headlamp 60 is, for example, an all glass sealed beam or metal back sealed beam determined in the SAE rule's standard, or a lamp unit in which the lamp is changeable, either a circular or a rectangular shape can be used. The first reflecting plates 37*a* and 37*b*, and the second reflecting plates 38*a* and 38*b*, in the same way as in the above second embodiment, are attached to the first and second housings 21 and 34 respectively. The reflection state of the beam for the third embodiment is almost the same as shown in FIG. 11, so the detailed explanation is abbreviated. In the headlamp for the third embodiment, by attaching the independent headlamp 60 inside the first and second housings as a source of the light beam, it has an advantage that the illumination surface can be easily changed to the laterally extending rectangular shape.

In the present invention, in any of the embodiments, the inside wall surface, the back of each reflecting plate and edge portions are all covered by a dark color, (or the color of the automobile body,) except the front surfaces of the reflector 11 and 22, the front of the independent headlamp 60, and the surfaces of the reflecting plates 13*a*, 13*b*, 14*a*, 14*b*, 37*a*, 37*b*, 38*a* and 38*b*. By covering the surfaces with the dark color (or the automobile body color), most of the light entering from the outside is absorbed by (the colored portions in the inside) or reflects, so the color of the beam reflected is changed to dark color (or the automobile body color). Therefore when the headlamp is viewed from the outside, only the coloring from the inside is recognized, and glare almost does not exist. When the light source of the beam is lighted, the white color beam reflected from the reflector and the reflecting plate can be emitted outside through the front lens, and the effect from the inside color painted portions to the white illumination beam does not exist.

As explained above, according to the headlamp of the present invention, the parallel reflected beams from revolution paraboloidal reflector or the independent headlamp attached inside are divided and arranged, after reflections on the first and the second reflecting plates, at the position of the both sides of the beams which directly proceed in the front lens, and proceed in parallel to the same direction of the direct beam from the reflector. Since the radiation face of the headlamp can be made to be a laterally extending slender rectangular shape, and since the light utilization rate is high, when this is used for a vehicle headlamp, a thin type rectangular headlamp with low consumed electric power and low degree of scattering to the upper direction can be realized.

The present invention has the excellent advantages that the headlamp can be provided, wherein the deviation of each reflecting plate position can be easily adjusted respectively by combining the first and second housings, by attaching the adjustment bolts to the first and second reflecting plates and by designing the adjustment bolt to be operable from the outside of the housings, and there is no deviation. In case of the beam axis adjustment to be required due to different kinds of vehicles, the adjustment can be easily and suitably done, by rotating the beam axis adjustment screws attached to the paraboloidal reflector. Thus, the system has an excellent advantage in general use.

What is claimed is:

1. A vehicle lamp, comprising:

a housing having a front portion and a rear portion; a paraboloidal reflector at said rear portion of said housing;

a laterally extending slender rectangular shaped front lens located at said front portion of said housing and facing in substantially the same direction as said paraboloidal reflector at least a major portion of said front lens lying on one side of a horizontal plane;

a lamp located so that the position of a filament thereof is at or near the focus of said paraboloidal reflector, whereby light produced by said lamp is reflected by said paraboloidal reflector in substantially the axial direction of said paraboloidal reflector;

at least two first reflecting plate members mounted in said housing so as to reflect right and left side portions of a portion of the light reflected by said paraboloidal reflector in an oblique upper or lower direction; said first reflecting plate members positioned so as to reflect light from a side of said horizontal plane opposite said one side and at least two second reflecting plate members positioned in parallel to respective first reflecting plate members, said at least two second reflecting plate members reflecting the light reflected from a corresponding first reflecting plate member in a direction substantially parallel to the light reflected by said paraboloidal reflector and in the same direction as said light reflected by said paraboloidal reflector;

a portion of the light reflected by said paraboloidal reflector and not reflected by said reflecting plate members being passed directly to said front lens; and said laterally extending slender rectangular shaped front lens being located in front of said paraboloidal reflector and in front of said first and second reflecting plate members for directly receiving a portion of said light reflected from said paraboloidal reflector, and for receiving the reflected right and left side portions of light from said second reflecting plate members, thereby providing a substantially uniform rectangular light beam having a high light utilization rate.

2. The vehicle lamp of claim 1, wherein said slender rectangular shaped front lens is located in front of the upper portion of said paraboloidal reflector for directly receiving light reflected from said upper portion of said paraboloidal reflector.

3. The headlamp of claim 1, wherein a center axis of said second reflecting plates and a center axis of said front lens are on a common vertical axis.

4. The headlamp of claim 1, wherein said first reflecting plates comprise a plurality of plates arranged to divide light reflected from said paraboloidal reflector and impinging upon said first reflecting plates into respective right and left side light beams, and wherein said second reflecting plates are curved.

5. The headlamp of claim 1, wherein said paraboloidal reflector comprises a cold mirror.

6. The headlamp of claim 1, wherein said paraboloidal reflector is provided inside the rear portion of said housing.

7. The headlamp of claim 1, wherein said first reflecting plate members reflect about one third of the light received from said paraboloidal reflector to the oblique direction at respective right and left sides of said housing.

8. The vehicle lamp of claim 1, wherein said housing comprises a rear housing portion housing said paraboloidal reflector, and a front housing portion coupled to said rear housing portion, said front housing portion housing said first and second reflecting plate members, said rectangular shaped front lens being at the front portion of said front housing portion 9. The vehicle lamp of claim 1, wherein at least a portion of the inside wall surfaces of said housing, except for the reflecting surfaces of said paraboloidal reflector and said first and second reflecting plate members, are dark in color.

10. The vehicle lamp of claim 1, wherein said housing comprises a rear housing portion housing said paraboloidal reflector, and a front housing portion in front of said rear housing portion, said front housing portion housing said first and second reflecting plate members, said rectangular shaped front lens being at the front portion of said front housing portion, and wherein said rear housing portion comprises an independent sealed beam headlamp.

11. The vehicle lamp of claim 1, further comprising adjustable mounting means for mounting said paraboloidal reflector to a rear portion of said housing, for adjusting the position of said paraboloidal reflector relative to said housing.

12. The headlamp of claim 11, wherein said adjustable mounting means for said paraboloidal reflector comprises a plurality of spaced apart adjustment means coupling said paraboloidal reflector to said housing.

13. The vehicle lamp of claim 1, wherein said first reflecting plate members are dimensioned so as to reflect more than about half of the light reflected from said paraboloidal reflector, the remaining light from said paraboloidal reflector being directed directly to said rectangular shaped front lens.

14. The vehicle lamp of claim 13, wherein said slender rectangular shaped front lens is located in front of the upper portion of said paraboloidal reflector for directly receiving light reflected from said upper portion of said paraboloidal reflector.

15. The headlamp of claim 14, wherein a center axis of said second reflecting plates and a center axis of said front lens are on substantially the same plane.

16. The vehicle lamp of claim 1, further comprising adjusting means for adjustably mounting said first and second reflecting plate members in said housing, whereby the positions of first and second reflecting plate members within said housing are adjustable.

17. The vehicle lamp of claim 16, wherein said adjusting means includes means for independently adjusting the positions of said first and second reflecting plate members.

18. The vehicle lamp of claim 17, further comprising adjustable mounting means for mounting said paraboloidal reflector to a rear portion of said housing, for adjusting the position of said paraboloidal reflector relative to said housing.

19. The headlamp of claim 18, wherein said adjustable mounting means for said paraboloidal reflector comprises a plurality of spaced apart adjustment means coupling said paraboloidal reflector to said housing.

20. The vehicle lamp of claim 18, wherein said adjustable mounting means for said paraboloidal reflector comprises a plurality of adjustment bolt means coupling said paraboloidal reflector to said housing.

* * * * *